United States Patent [19]

Barrera

[11] 4,304,045
[45] Dec. 8, 1981

[54] DEVICE FOR PLACING PREWOUND COILS INTO STATOR SLOTS

[75] Inventor: Giorgio Barrera, Leumann, Italy

[73] Assignee: Officine Meccaniche Pavesi & C. S.p.A., Turin, Italy

[21] Appl. No.: 77,529

[22] Filed: Sep. 27, 1979

[30] Foreign Application Priority Data

Oct. 24, 1978 [IT] Italy .................. 69440 A/78

[51] Int. Cl.³ ............................ H02K 15/06
[52] U.S. Cl. ....................... 29/736; 29/596
[58] Field of Search ............ 29/732, 736, 734, 596, 29/606

[56] References Cited

U.S. PATENT DOCUMENTS 3,559,268  2/1971  Droll ........................ 29/732
3,689,976  9/1972  Donovan ................... 29/736
4,047,293  9/1977  Kieffer ...................... 29/736

Primary Examiner—Carl E. Hall
Attorney, Agent, or Firm—Bernard, Rothwell & Brown

[57] ABSTRACT

A device for placing prewound coils into stator slots comprises an annular series of fingers housed in respective longitudinal grooves of the outer surface of a hollow cylindrical finger holder. The fingers project beyond one end of the holder for placement thereon of prewound coils. A stripper member axially movable through the stator is provided on its periphery with a series of longitudinal grooves wherein the portion of each finger which projects beyond the holder is received. Some fingers, and preferably at least one finger of each couple of adjacent fingers between which a prewound coil is interposed is slidably mounted both within said stripper member and within said holder.

5 Claims, 3 Drawing Figures

DEVICE FOR PLACING PREWOUND COILS INTO STATOR SLOTS

BACKGROUND OF THE INVENTION

1. Field of the Invention

The present invention relates to the production of stators for electrical machines and the like, and in particular it relates to a new and improved device for placing pre-wound coils into stator slots.

2. Prior Art

A known apparatus for inserting prewound coils into stator slots includes a star-shaped stripper member having in its outer periphery a series of longitudinal grooves, the said stripper member being movable parallel to its axis and slidable relative to elongated fingers located in said grooves.

Prewound coils are initially placed onto these figures as the latter extend through the centre of the stator. The stripper member is then moved to the centre of the stator, sliding along the fingers, to remove the coils from the fingers and insert the same into the stator slots. The end portions of the fingers which are opposite to the stator are housed in respective longitudinal grooves of a fixed hollow cylindrical finger holder, the grooves of said holder being aligned with the grooves of the stripper member.

An apparatus of this general type is disclosed in the U.S. Pat. No. 3,324,536, issued June 13, 1967. The device shown in this patent comprises an outer tubular housing provided with threaded bores in which screws are engaged for clamping each of the fingers in their respective grooves in the finger holder. Thus, the fingers are fixed relative to the holder, while the stripper member is slidable relative to the fingers. Therefore, in such known device, during the insertion procedure the wires of a coil frictionally engage the two adjacent fingers between which the coil is interposed. If the coil is large relative to the size of the space between the two adjacent fingers, the individual wires of the coil are jammed against each other as a result of this frictional engagement thereby pinching the coil. This happens if the diameter of the wire of the prewound coil is such that the angle of friction between two adjacent wires in the space between the two adjacent fingers is less than the critical angle of friction.

Numerous solutions for this problem have been proposed but none has been completely satisfactory. One such solution is to vary the size of the gaps between the fingers in dependence on the diameter of the wire to be inserted into the stator but this results in complications due to the need to replace the fingers when the diameter of the wire is to be varied.

A further solution is to form a stripper member in such a way that the coils are drawn rather than pushed thereby, but this leads to constructional complications and does not resolve the problem.

Another solution to the above-described problem is disclosed in the U.S. Pat. No. 3,559,268, issued February 2, 1971. This Patent is directed to a device of the above described general type, in which some of the fingers, preferably at least one finger of each couple of adjacent fingers between which a coil is interposed is fixed to the stripper member so as to slide axially therewith. Thus, since there is no sliding of the fingers which are fixed to the stripper member relative to the coil, there is no detrimental frictional engagement between the fingers and the coil. However, this solution still has the following drawbacks:

(a) the traction force exerted on the coils by the fingers fixed to the stripper member sometimes damages the varnish on the wire;

(b) it is not possible, with this device, to insert several layers of wire simultaneously.

SUMMARY OF THE INVENTION

It is the object of the present invention to provide a device of the aforesaid type which can insert prewound coils into the slots of a stator while avoiding both jamming of the coils between the fingers of the device and the other disadvantages of the known devices.

This object is achieved by providing a device of the above specified type for inserting prewound coils into stator slots, wherein at least one finger of each couple of adjacent fingers between which a coil is interposed is slidably mounted both within said stripper member and within said holder.

Thus, during the insertion procedure, when the friction between the coils and the fingers is relatively high, such that jamming might occur, the friction between the wires and the adjacent fingers in fact causes axial movement of the slidable fingers with the coil. In other words, instead of having fingers which are always fixed to the finger holder, or which are always fixed to the stripper member, the device according to the present invention has fingers which usually remain in a fixed position relative to the finger holder and can slide axially relative to the holder together with the stripper member when the friction between the wires of each coil and the adjacent fingers becomes too high.

According to a preferred embodiment of the invention, each of the fingers which are slidably mounted both within said holder and within said stripper member, is provided on its portion extending beyond the holder with a stop element projecting from the inner face of the finger; said stripper member having a lower surface which is in contact with said stop element when said stripper member is in a withdrawn, rest position. Thus, during the insertion procedure, in case some of the slidable fingers slide axially with the stripper member, the latter engages said stop element on its return from the coil-inserting movement to return each slidable finger to its initial position.

The foregoing and further objects, features and advantages of the present invention will be apparent from the following more particular description, together with the accompanying drawings.

DETAILED DESCRIPTION OF THE INVENTION

Figure 1:
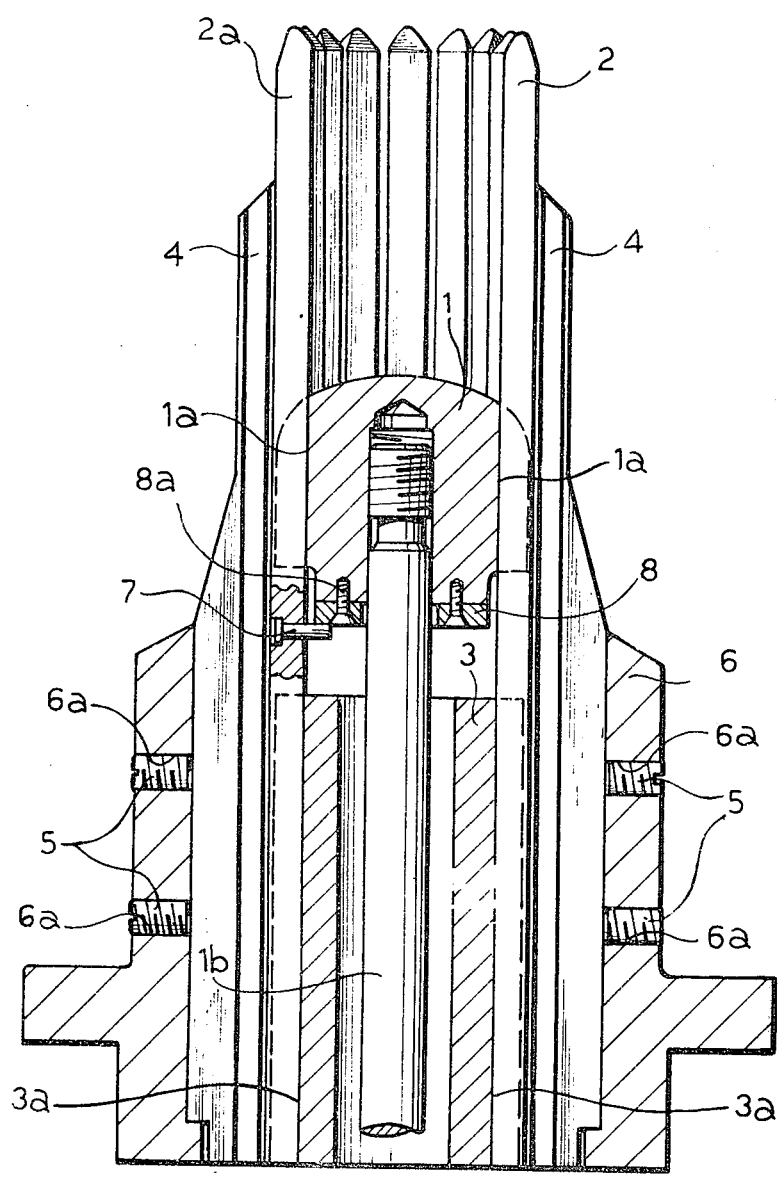
FIG. 1 is an axial section of a device according to a first embodiment of the invention, showing the stripper member in its rest position.

The general structure of the devices shown in the accompanying drawings is substantially equal to the structure of the device disclosed in U.S. Pat. No. 3,324,536, issued to Hill. Therefore, only the part of the device which has been modified according to the present invention is shown in the drawings.

The device includes a stripper member 1 of cylindrical shape with a rounded nose. The stripper member 1 is provided with a series of longitudinal grooves 1a on its periphery. An annular series of fingers 2 surrounds the stripper member 1, each finger being received in one of the grooves 1a of the stripper member 1.

Reference numeral 3 indicates a fixed hollow cylindrical finger holder which is provided with a series of longitudinal grooves 3a on its periphery. The grooves 3a of the holder 3 are aligned with the grooves 1a of the stripper member 1. Each finger 2 is received in one of the grooves 3a and projects from the end of the holder 3 which is closer to the stripper member 1.

A stem 1b is fixed to the stripper member 1 and is driven by an hydraulic cylinder (not shown) so as to be adapted to cause a sliding movement of the stripper member 1 within the annular series of fingers 2.

The annular series of fingers 2 is surrounded by a series of wedge guide members 4, one for each of said fingers, each wedge guide member 4 extending lengthwise over a respective finger on the outside thereof and terminating short of the forward end of the finger, leaving room for a stator (not shown) which is to be mounted coaxially with the annular series of fingers 2. The wedge guide members 4 are to be used to guide insulated wedges into the stator slots for retaining the prewound coils placed in said slots.

A hollow cylindrical housing 6 surrounds the wedge guide members 4 and is provided with threaded bores 6a in which screws 5 are engaged. In the device disclosed in the patent to Hill, the screws 5 are used to clamp the wedge guide members 4 against the fingers 2 and to clamp the fingers 2 in position in the grooves 3a of the hollow cylindrical finger holder 3. Thus, in this known device, the fingers 2 are fixed to the holder 3. In order to insert prewound coils into the slots of a stator, prewound coils are arranged on the fingers 2 and then the stripper member 1 is moved upward to insert the prewound coils into the stator slots. In the Hill device the frictional engagement between the individual wires of a coil which are interposed between two adjacent fingers can cause a jamming of said wires against each other.

In the device according to the present invention, some of the fingers, preferably at least one finger of each couple of adjacent fingers between which the wires of a coil are interposed, is slidably mounted both within the stripper member 1 and within the holder 3. In the device shown in the annexed drawings, which has a general structure substantially identical to the structure of the Hill device, this can be accomplished simply by loosening the screws 5 which are associated to the fingers that must be slidable with respect to the holder 3. The fingers which are slidably mounted within the respective grooves of the finger holder 3 are indicated by the reference numeral 2a.

Each of the fingers 2a is provided with a pin 7 which projects inwardly from the inner face of the finger. The pin 7 is in contact with the lower face of the stripper member 1 when the latter is in its lowered rest position shown in FIG. 1. The lower face of the stripper member 1 is provided with a plate 8, fixed by means of screws 8a, of a material having a hardness greater than that of the material which forms the stripper member 1.

Figure 2:
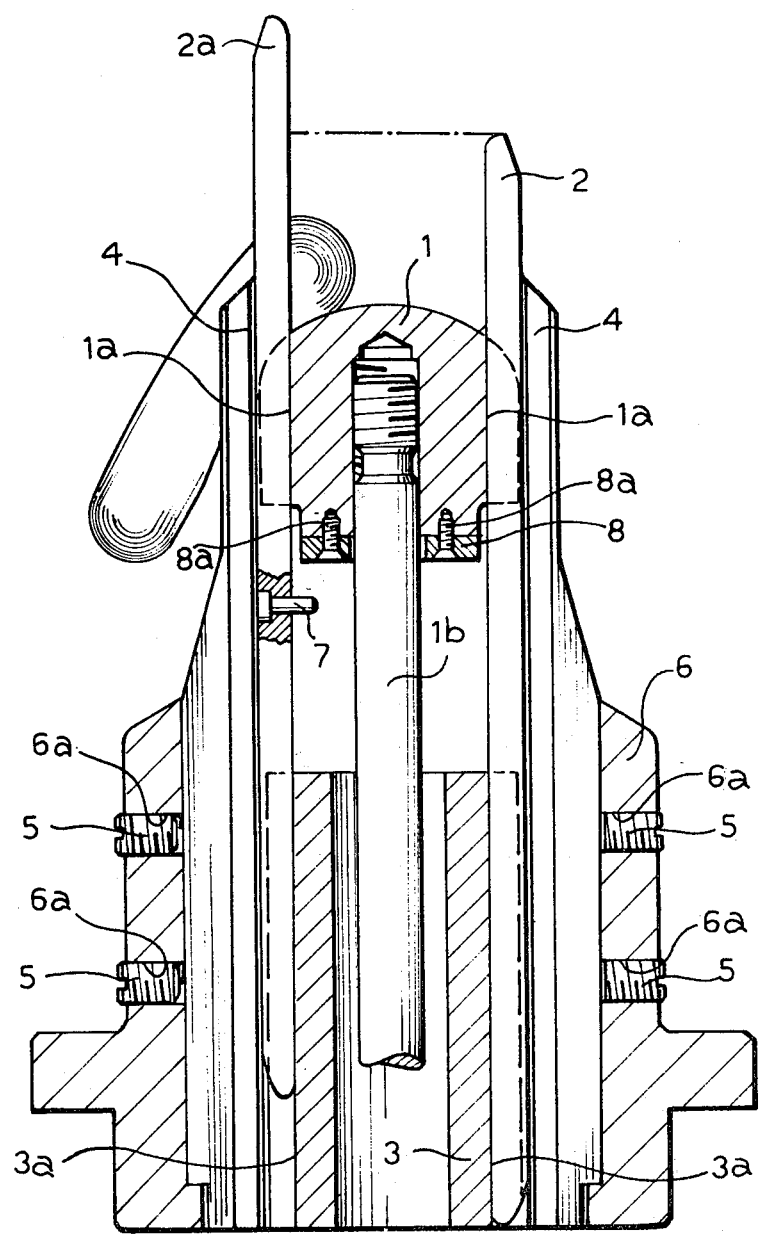
FIG. 2 is an axial section of the device of FIG. 1, showing the stripper member in its coil-inserting position.
Figure 3:
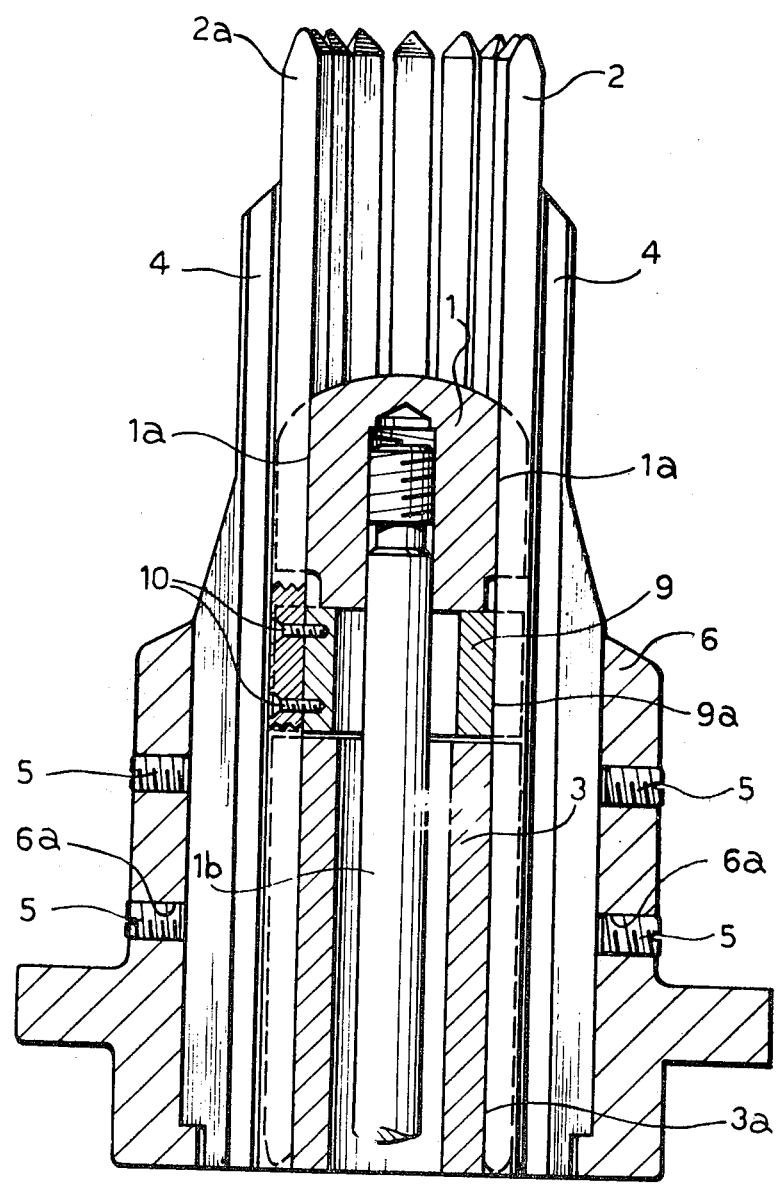
FIG. 3 is an axial section of a device according to another embodiment of the invention.

In operation of the device, when the stripper member 1 is moved upwardly in order to insert the prewound coils arranged on the fingers 2 into the slots of a stator, the fingers 2a move also upwardly in case the frictional engagement between the wires of the coils and the fingers is too high, thereby eliminating the risk of jamming of said wires. FIG. 2 shows the device of FIG. 1 during the upward movement of the stripper member 1. A prewound coil C is shown arranged on the fingers of the device. During the return movement of the stripper member 1 towards its rest position, the plate 8 engages the pin 7 of each finger 2a, thereby returning said fingers 2a in their lowered position. The embodiment of FIG. 3 differs from the embodiment of FIGS. 1 and 2 only in that the stop element carried by the fingers 2a which cooperate with the plate 8 of the inner stripper member 1 is comprised of a tubular element 9 fixed to the fingers 2a by means of screws 10. The tubular element 9 is provided with a series of longitudinal grooves 9a on its periphery which are aligned with the grooves 3a of the holder 3 and the grooves 1a of the stripper member 1.

While the invention has been particularly shown and described with reference to preferred embodiments thereof, it would be understood by those skilled in the art that various changes in form and details may be made therein without departing from the spirit and scope of the invention.

What is claimed is:

1. A device for placing prewound coils in the slots of a stator comprising:
   a fixed hollow cylindrical finger holder having a series of longitudinal grooves on its periphery;
   an annular series of fingers around said holder, each finger being received in one of said grooves, said fingers projecting beyond one end of said holder for placement thereon of prewound coils;
   stripper means axially slidable within the annular series of fingers and through a stator for driving coils over said fingers and into the slots of the stator, said stripper means being comprised of a stripper member having in its periphery a plurality of longitudinal grooves, each finger being received in one of said grooves of the stripper member, at least one finger of each couple of adjacent fingers between which a coil is interposed being slidably mounted with regard to said stripper member and being also mounted for axial sliding movement with said holder for a distance at least equal to the distance of movement of the stripper.

2. A device as set forth in claim 1, wherein each of the fingers which are slidably mounted both within said holder and within said stripper member is provided on its portion extending beyond said holder with a stop element projecting from the inner face of the finger; said stripper member having a lower surface which is in contact with said stop element when said stripper member is in a withdrawn position.

3. A device as set forth in claim 2, wherein said stop element is comprised of a pin fixed to the inner face of the finger.

4. A device as set forth in claim 2, wherein said stop element is comprised of a tubular element which is axially interposed between said holder and said stripper member and provided with a series of longitudinal grooves on its periphery, said grooves of the tubular element being aligned with said grooves of said holder, said tubular element being fixed to said fingers which are slidably mounted both within said holder and within said stripper member.

5. A device as set forth in claim 3, wherein said lower surface of the stripper member is provided with a plate of a material which is harder than that of said stripper member.

* * * * *

UNITED STATES PATENT AND TRADEMARK OFFICE
CERTIFICATE OF CORRECTION

PATENT NO. : 4,304,045

DATED : December 8, 1981

INVENTOR(S) : Giorgio Barrera

It is certified that error appears in the above—identified patent and that said Letters Patent is hereby corrected as shown below:

Column 1, line 18, "figures" should be --fingers--.

Signed and Sealed this

Fourth Day of May 1982

[SEAL]

Attest:

GERALD J. MOSSINGHOFF

Attesting Officer     Commissioner of Patents and Trademarks